United States Patent [19]

Fujisawa

[11] Patent Number: 4,484,201

[45] Date of Patent: Nov. 20, 1984

[54] PEN TYPE RECORDING APPARATUS

[75] Inventor: Kyuichi Fujisawa, Tonan, Japan

[73] Assignee: Alps Electric Co., Ltd., Tokyo, Japan

[21] Appl. No.: 409,866

[22] Filed: Aug. 20, 1982

[30] Foreign Application Priority Data

Aug. 21, 1981 [JP] Japan .................. 56-122958[U]

[51] Int. Cl.³ ............................................. G01D 15/00
[52] U.S. Cl. ................................. 346/139 C; 358/303
[58] Field of Search ................. 346/141, 139 B, 105, 346/106, 139 C, 139 A; 358/303; 360/103

[56] References Cited

U.S. PATENT DOCUMENTS

| | | | |
|---|---|---|---|
| 1,915,426 | 6/1933 | Kohler | 346/139 C X |
| 2,484,298 | 10/1949 | Krahulec | 346/139 |
| 2,694,615 | 11/1954 | Clements | 346/139 C |
| 2,969,435 | 1/1961 | Lynott | 360/103 |
| 3,149,901 | 9/1964 | Hagelbarger | 346/139 C X |
| 3,164,435 | 1/1965 | Grafstein | 346/139 A |
| 3,261,021 | 7/1966 | Kirchner | 346/1 |
| 3,730,975 | 5/1973 | Kono | 358/303 X |
| 3,817,367 | 6/1974 | Tramposch | 197/18 |
| 3,921,179 | 11/1975 | Weerstra | 346/155 |
| 4,259,025 | 3/1981 | Jamieson | 400/18 |
| 4,261,285 | 4/1981 | Pearl | 118/37 |
| 4,441,109 | 4/1984 | Fujisawa | 346/139 R |

Primary Examiner—Joseph W. Hartary
Attorney, Agent, or Firm—Guy W. Shoup; Gerard F. Dunne

[57] ABSTRACT

A pen type recording apparatus employing pressure-sensitive recording paper, comprising a pen member which has a case that holds a ball rotatably at its tip and that contains therein a lubricant for smoothing the rotation of the ball, a pen holder which holds the pen member in a manner capable of protruding it onto the pressure-sensitive recording paper so as to press the ball against the recording paper, and a driving mechanism which moves the pen holder in the widthwise direction of the recording paper.

4 Claims, 3 Drawing Figures

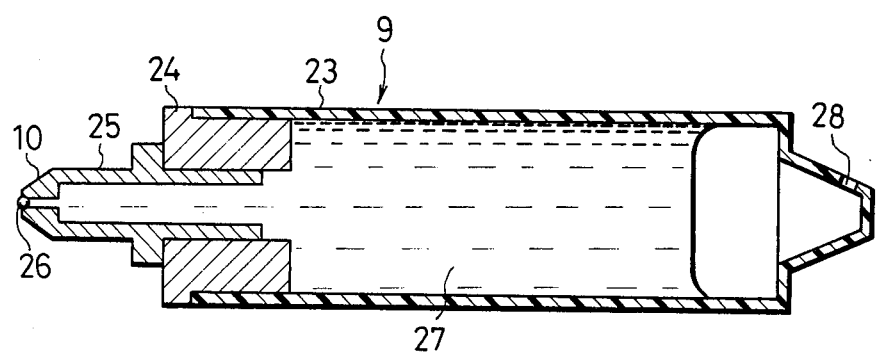

PEN TYPE RECORDING APPARATUS

BACKGROUND OF THE INVENTION

The present invention relates to a pen type recording apparatus for use in an X-Y plotter, an alphanumeric printer, or the like.

With conventional pen recorders, it is often feared that ink will be used up. Moreover, fast recording is required of the pen recorders.

SUMMARY OF THE INVENTION

An object of the present invention is to provide a pen type recording apparatus which is free from the fear of the complete consumption of ink and which is capable of fast recording.

In one aspect of performance of the present invention, a pen type recording apparatus is characterized by comprising a pen member which has a case that holds a hard ball rotatably at its tip and contains therein a lubricant for smoothing the rotation of said ball. A pressure-sensitive recording paper is provided for recording data by its motion relative to said pen member in such a way that said ball of said pen member is pressed against said recording paper. A pen holder holds said pen member in a manner capable of pressing said pen member onto the pressure-sensitive recording paper side, and driving means to cause said pen holder to travel within a predetermined area in a widthwise direction of said pressure-sensitive recording paper are provided.

BRIEF DESCRIPTION OF THE DRAWINGS

FIG. 3 is an enlarged sectional view of a pen for use in the recording apparatus.

PREFERRED EMBODIMENT OF THE INVENTION

Figure 1:
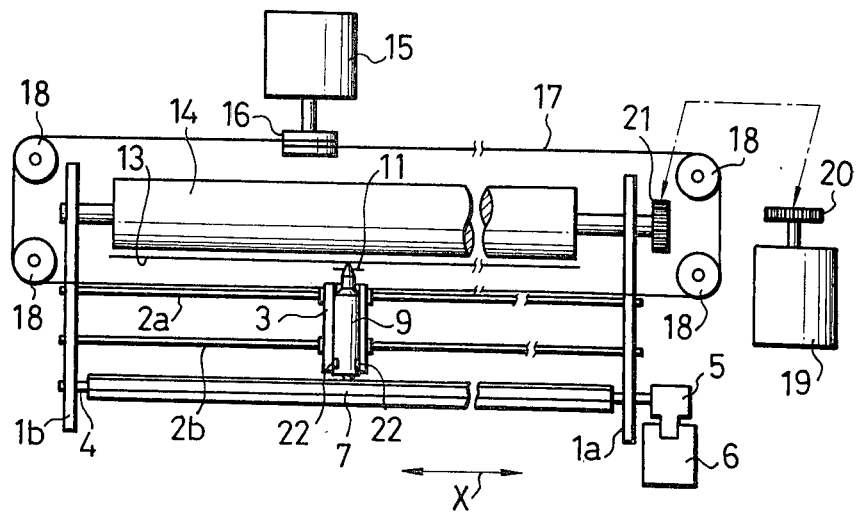
FIG. 1 is a schematic constructional view of a pen type recording apparatus embodying the present invention.

Now, an embodiment of the present invention will be described with reference to the drawings. As shown in FIG. 1, two guide shafts 2a and 2b are extended across side plates 1a and 1b which are arranged in parallel at a predetermined interval, and a pen holder 3 which is molded of a synthetic resin is slidably disposed in such a way that the guide shafts are inserted through the pen holder.

A hammer shaft 4 is also extended between the side plates 1a and 1b and in parallel with the guide shafts 2a and 2b. A lever 5 attached to the right end of the hammer shaft 4 is coupled with the moving part of a self-maintaining solenoid 6 which becomes stable bidirectionally. Thus, the hammer shaft 4 is turned a predetermined angle by controlling the energization state of the solenoid. The hammer shaft 4 is oval in section, and a hammer element 7 which extends over substantially the whole area of movement of the pen holder 3 is fixed to the hammer shaft by press-fitting the latter into the former.

Figure 2:
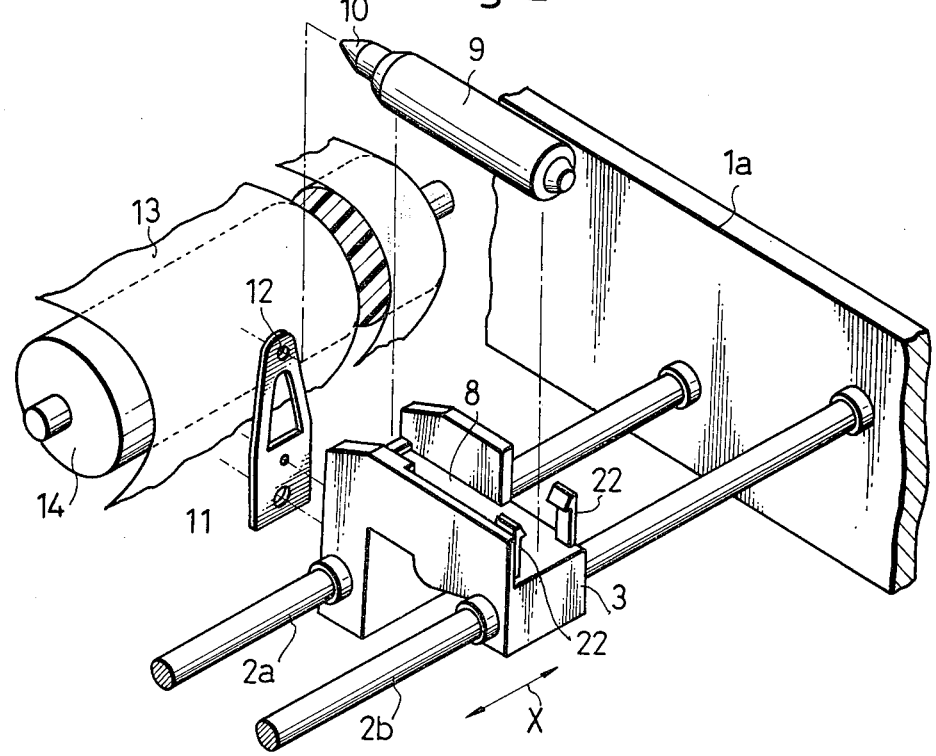
FIG. 2 is a partial enlarged perspective view of the recording apparatus.

As shown in FIG. 2, a pen 9 is slidably received in a slide groove 8 which is provided on the upper side of the pen holder 3 and in the longitudinal direction thereof. The pen 9 has a structure as shown in FIG. 3. That is, it is constructed of a case 23 which is cylindrical and which is open on one side, a ball tip 25 which is attached to the opening of the case 23 through a tip holder 24, a hard ball 26 which is rotatably held at the front end of the ball tip 25, and lubricating oil 27 which is injected in the case 23. Numeral 28 indicates a vent hole which is formed in the bottom part of the case 23. The lubricating oil 27 in the case 23 penetrates onto the contact surface between the ball 26 and the ball tip 25 through the hollow part of the ball tip 25, thereby to smooth the rotation of the ball 26 within the ball tip 25. A preferred lubricating oil 27 is one which has a high viscosity that changes little depending upon temperature, and which is difficult to volatilize. For example, "FLOIL G-488" (trade name, produced by Kantoh Kasei Kabushiki-Kaisha in Tokyo, Japan) is suitable. The front end part of the pen 9 has a conical portion 10, which is fitted in a through hole 12 provided in the free end of a plate spring 11 as shown in FIG. 2. The pen 9 is normally urged towards the hammer element 7 by the resiliency of the plate spring 11, and the front end of the pen 9 opposes a platen 14 with pressure-sensitive recording paper 13 held therebetween. The base part of the plate spring 11 is mounted on the front surface of the pen holder 3.

Shown at numeral 15 in FIG. 1 is a pulse motor for shifting the pen holder 3. A rope (string) 17 wound around a driving pulley 16 of the pulse motor 15 has both its ends respectively connected to the sides of the pen holder 3 through a plurality of guide pulleys 18. Thus, the pen holder 3 is shifted in the axial directions of the guide shafts 2a and 2b (in the directions of arrows X) through the rope 17 which forms a closed loop. Shown at numeral 19 is a pulse motor for shifting the pressure-sensitive recording paper 13. This pulse motor is connected with the platen 14 through gears 20 and 21, etc., and the pressure-sensitive recording paper 13 is shifted in directions perpendicular to the sheet of FIG. 1 by the forward and reverse rotations of the pulse motor 19.

As shown in FIG. 2, holes through which the guide shafts 2a and 2b are inserted are provided on the lower side of the pen holder 3, and resilient pieces 22 for snapping the pen 9 into the slide groove 8 are provided oppositely on respective sides of the rear end part of this groove formed in the upper part of the pen holder 3.

In the print stand-by state of the recording apparatus, the pen 9 has its rear end pressed towards the hammer element 7 by the resiliency of the plate spring 11 as stated before, so that the front end of the pen 9 lies at a predetermined distance from the pressure-sensitive recording paper 13. When, under this state, the pulse motor 15 for shifting the pen holder is rotated, the pen holder 3 is moved in the direction of the arrow X crossing the paper 13, along the guide shafts 2a and 2b through the rope 17.

When the pen holder 3 (pen 9) has been shifted to a desired position with respect to the pressure-sensitive recording paper 13, the solenoid 6 is energized. Then, the hammer element 7 is turned a predetermined magnitude onto the side of the platen 14 through the lever 5 as well as the hammer shaft 4, whereby the pen 9 is pushed out towards the pressure-sensitive recording paper 13 against the resiliency of the plate spring 11. In the state in which the front end of the pen 9, i.e., the ball 26 is pressed against the pressure-sensitive recording paper 13, the pen holder 3 and/or the pressure-sensitive recording paper 13 are/is moved, whereby a desired line can be depicted on the pressure-sensitive recording paper 13. That is, any desired data such as patterns and characters are recorded on the pressure-sensitive recording paper 13 by properly controlling the drive and stop of the pen holder-shifting pulse motor 15, the paper-shifting pulse motor 19 and the solenoid 6.

As thus far described, the present invention is characterized by comprising a pen member which has a case that holds a hard ball rotatably at its tip and that contains therein a lubricant for smoothing the rotation of said ball, pressure-sensitive recording paper on which data are recorded by its motion relative to said pen member in such a way that said ball of said pen member is pressed against said recording paper, a pen holder which holds said pen member in a manner capable of protruding said pen member onto the pressure-sensitive recording paper side, and driving means to cause said pen holder to travel within a predetermined area in a widthwise direction of said pressure-sensitive recording paper.

Accordingly, the complete consumption of ink is not feared. Moreover, since the rotation of the ball is smooth at all times, the traveling resistance of the pen holder during recording is low, so that fast recording is possible and that the pressure-sensitive recording paper is not damaged by the pen member, the recorded surface being clear.

I claim:

1. A pen type recording apparatus comprising a pen member having a case, means formed at one end of said case for holding a hard ball rotatably in position at its tip, means including a highly-viscous lubricant provided in said case for smoothing the rotation of said ball, means including pressure-sensitive recording paper for receiving data recorded by motion of said paper relative to said pen member in such a way that said ball of said pen member is pressed against said recording paper, means including a pen holder for holding said pen member detachably in a manner capable of extending said pen member onto the pressure-sensitive recording paper, and driving means to cause said pen holder to travel within a predetermined area across said pressure-sensitive recording paper.

2. A pen type recording apparatus according to claim 1, wherein said pen member has a ball tip element which holds said ball at its tip, and a tip holder through which said ball tip element is attached to said case.

3. A pen type recording member including pressure-sensitive recording paper adapted to be moved longitudinally, a carriage adapted to be moved transversly across said recording paper and carrying a pen member having a rotatable ball element in its forward end portion, means for selectively urging said pen member forwardly for pressing said rotatable ball against said recording paper, said pen member including a highly-viscous lubricant contacting said ball, and said carriage including means for holding said pen detachably thereto.

4. A pen type recording member according to claim 3, said holding means including a groove formed in said carriage for receiving said pen member and two arm portions extending upwardly from opposing rear portions of said groove and adapted to snap over said pen member.

* * * * *